United States Patent [19]
Ko

[11] Patent Number: 5,386,235
[45] Date of Patent: Jan. 31, 1995

[54] MOTION SIGNAL DETECTING CIRCUIT

[75] Inventor: Jung-Wan Ko, Lawrenceville, N.J.

[73] Assignee: SamSung Electronics Co., Ltd., Kyungki, Rep. of Korea

[21] Appl. No.: 711,980

[22] Filed: Jun. 7, 1991

[30] Foreign Application Priority Data

Nov. 19, 1990 [KR] Rep. of Korea .............. 90-18737

[51] Int. Cl.$^6$ .................. H04N 9/64; H04N 7/12
[52] U.S. Cl. ............................ 348/427; 348/430; 348/431
[58] Field of Search .......... 358/31, 11, 12, 13, 358/16, 17, 36, 37, 39, 40, 166, 167, 141, 142, 310, 315, 328, 334; H04N 9/64, 7/08, 7/12; 348/426, 427, 428, 429, 430, 431, 424, 425, 432, 433

[56] References Cited

U.S. PATENT DOCUMENTS

| | | | |
|---|---|---|---|
| 3,895,393 | 7/1975 | Drummond et al. | 358/31 |
| 4,621,236 | 11/1986 | Reitmeier et al. | 358/12 |
| 4,686,561 | 8/1987 | Harwood et al. | 358/31 |
| 4,692,801 | 9/1987 | Ninomiya et al. | 348/425 |
| 4,772,961 | 9/1988 | Ichinoi | 358/128 |
| 4,831,463 | 5/1989 | Faroudja | 358/31 |
| 4,868,650 | 9/1989 | Weckenbrock | 358/105 |
| 4,891,699 | 1/1990 | Hammada et al. | 348/424 |
| 4,893,176 | 1/1990 | Faroudja | 358/16 |
| 4,943,848 | 7/1990 | Fukinuki | 358/12 |
| 4,958,230 | 9/1990 | Jonnalagadda et al. | 358/12 |
| 4,984,077 | 1/1991 | Uchida | 348/424 |
| 5,031,030 | 7/1991 | Hurst, Jr. | 358/16 |
| 5,051,826 | 9/1991 | Ishii et al. | 358/105 |
| 5,063,457 | 11/1991 | Ishitawa et al. | 358/330 |
| 5,083,203 | 1/1992 | Ko et al. | 358/167 |
| 5,113,262 | 5/1992 | Strolle et al. | 358/323 |
| 5,161,030 | 11/1992 | Song | 358/330 |

OTHER PUBLICATIONS

Research Disclosure on "Video Signal Bandwidth Compression", No. 183, Jul. 1989, pp. 382-384 (disclosed anonymously).

Journal of British I.R.E. on "Reduction of Television Bandwidth by Frequency-Interlace", Feb. 1960, pp. 127-136 (disclosed by Howson and Bell).

Primary Examiner—Victor R. Kostak
Assistant Examiner—Michael H. Lee
Attorney, Agent, or Firm—Robert E. Bushnell

[57] ABSTRACT

The motion signal detecting circuit is adapted to an image reproducing system having a frequency unfolding circuit for generating an unfolded luminance signal by unfolding a high frequency component folded into low frequency component into the original frequency band in order to reproduce a full bandwidth image signal in which the high frequency component folded into the low frequency component and recorded on a recording medium having a limited bandwidth. The detecting circuit comprises a prefilter for eliminating the folding carrier contained in the unfolded luminance signal and sidebands thereof and a comb filter for detecting a motion signal which is the differential component between frames in the unfolded luminance signal by filtering the output of the prefilter.

22 Claims, 4 Drawing Sheets

MOTION SIGNAL DETECTING CIRCUIT

CROSS-REFERENCE TO RELATED APPLICATIONS

This application makes reference to U.S. patent application entitled IMPROVING THE REMOVAL OF THE FOLDING CARRIER AND SIDE BAND FROM AN UNFOLDED VIDEO SIGNAL filed in the U.S. Patent and Trademark Office on Aug. 6, 1990 and assigned Ser. No. 07/562,907, and constitutes a continuation-in-part thereof.

BACKGROUND OF THE INVENTION

The present invention relates to a system for smoothing of spreading transitions between image regions included in television signals to be transmitted which are processed in a still picture signal processing method and a motion picture signal processing method, and particularly to a circuit for accurately detecting a motion signal which represents a moving image, so as to control the transitions between image regions of a frequency-unfolded image signal.

Standard television system such as an NTSC or a PAL system, which represent images, processes a television signal adaptively in accordance with an amount of motions of the signal. This adaptive processing of the signal may result in quasi-motion picture regions between image regions being processed in a still picture signal processing method and other image regions being processed in a motion picture signal processing method. If differences in the processing methods are perceived and, the different regions and the transition between them are discerned by a viewer, image quality is degraded.

For example, for the purpose of separating chrominance and luminance components from a composite video signal, a frame comb filter or a line comb filter may be used. As long as there is no change in the image signal at frame time intervals, when separating chrominance and luminance components from the composite video signal using the frame comb filter, the luminance and chrominance components can be completely separated. If the scene changes, however, over the frame time intervals, then some color information will be present in the separated luminance component and some brightness information will be present in the chrominance component.

A line comb filter also used to separate the luminance and chrominance components from the composite video signal does not produce significantly degraded component signals in the presence of image motion. However, the line comb filter reduces the vertical resolution of the reproduced image in comparison with the frame comb filter. In addition, in locations where a vertical transition occurs, an image processed by the line comb filter may be degraded due to both color information introduced into the luminance component, producing an image artifact known as hanging dots and brightness information introduced into the chrominance, producing incorrect colors in the neighborhood of the transition.

Therefore the television signal is adaptively processed by detecting the presence or absence of image motion. In the regions in which the image is stationary, the frame comb filter is used, and in the regions in which the image is moving, the line comb filter is used.

Another example of such adaptive processing is an adaptive double-scanned, non-interlaced scan converter. In such a converter, interstitial lines are displayed between lines of the current field. However, the interstitial lines may be those transferred from the preceding field, in the presence of image changes producing visible artifacts such as serrated contours. The interstitial lines may also be interpolated from lines within the current field, but the vertical resolution is reduced and line flicker may occur. In regions in which image changes are detected, intrafield interpolated interstitial lines are displayed and field-delayed interstitial lines are displayed in other way.

Yet another example is an adaptive peaking circuitry in which regions having relatively high noise are processed with a relatively low peaking factor and regions having relatively low noise are processed with a relatively high peaking factor.

In all of the above examples, the television signals are processed adaptively in response to the values of estimated parameters of the image. The parameters are a motion in the case of luminance/chrominance separation and double scanning non-interlaced conversion, and a relative level of noise in the case of the peaking. Differently processed regions, and noticeable boundaries between regions where the parameter is present and those where it is absent are undesirable artifacts introduced by the above types of adaptive processing types.

U.S. Pat. No. 5,113,262 issued May 12, 1992, to Strolle et alii, entitled "AN IMPROVED VIDEO SIGNAL RECORDING SYSTEM" and assigned to Samsung Electronic Co., Ltd., describes a recording system for recording and reproducing a full bandwidth video signal on and from a recording medium having a limited bandwidth by folding the high frequency component of a luminance signal into the low frequency component of the luminance signal.

In U.S. Pat. No. 5,113,262 a motion signal which represents a moving image is recorded together with the folded luminance signal and the chrominance signal on the recording medium. The motion signal is used to control the transition between regions of the full bandwidth luminance signal which is unfolded into the original frequency bands when reproducing.

That is, in the previous work of the inventor and his co-workers, the high frequency component of the luminance signal is folded into the low frequency component of the luminance signal in recording. At this time, the high frequency component of the luminance signal is modulated by a folding carrier, so that the folded luminance signal has a phase difference of 180 degrees between frames, between scanning lines, and between pixels.

Accordingly, in reproducing, the high frequency component folded into the low frequency component of the folded luminance signal is demodulated by the unfolding carrier having the same phase and frequency as those of the folding carrier, so that the high frequency component of the luminance signal is unfolded to the original frequency band.

However, the folding carrier and the sideband thereof will be present in the unfolded luminance signal. The resultant luminance signal unfolded by the folding carrier and the sidebands thereof has a phase difference of 180 degrees between frames.

As a result, the conventional motion signal detecting circuit for detecting the level difference of pixels between fames as the motion signal, has difficulty in detecting accurately the motion signal from the unfolded luminance signal due to the phase off-set between frames.

More particularly, the unfolding procedure involves the heterodyning, or multiplicative mixing, of the folded-spectrum signal (or the folded-down portion thereof separated by comb filtering) with an unfolding carrier, the horizontal spatial frequency of which is located above the folded spectrum. This unfolding carrier acquires lower and upper sidebands from this multiplicative mixing procedure. The original high-frequency subspectrum, which appears in the folded-spectrum signal as a reversed-in-frequency subspectrum that occupies the same band as the original low-frequency subspectrum, mixes with the unfolding carrier to generate a lower sideband component that reproduces the original high-frequency subspectrum without spectrum reversal. There is also a higher sideband component which reproduces the reversed-in-frequency subspectrum as translated up in frequency, which product of the unfolding procedure can be suppressed by lowpass filtering or bandreject filtering.

In practice, since the folded-spectrum signal is descriptive of both image portions that change from frame to frame and image portions that do not change from frame to frame, separating the folded-down portion of the folded-spectrum signal by comb filtering cannot be done without previously generating a motion signal indicative of frame-to-frame change in the signal prior to its having been folded. As noted previously, such a motion signal cannot be determined from the folded-spectrum signal using highpass frame comb filtering, because in the folded-spectrum signal the frame-to-frame reversal of phase in the folded-down high frequency subspectrum is indistinguishable from frame-to-frame change in the signal prior to its having been folded. U.S. patent application Ser. No. 07/569,029 describes an unfolding procedure in which the complete folded-spectrum signal is mixed with the (un)folding carrier. Then, the resulting product is vertically lowpass filtered to generate an unfolded high-frequency subspectrum that is added back to the complete folded-spectrum signal. In the unfolded signal that results from this additive combining, the low-frequency subspectrum is still accompanied by an overlapping folded-high-frequency subspectrum. Since it is an in-band artifact of unfolding, removal of this undesirable reversed-in-frequency subspectrum cannot be done by the lowpass filtering or bandreject filtering of the prior art.

When the complete folded-spectrum signal is mixed with the (un)folding carrier to generate an unfolded high-frequency subspectrum, there are other undesirable products of the unfolding procedure that arise from the original low-frequency subspectrum multiplicatively mixing with the unfolding carrier. These products exhibit frame-to-frame anti-correlation, so they must be suppressed in signal supplied to a motion detector, or they will be detected to give spurious indications of frame-to-frame image motion. There is an additional upper sideband component of the unfolding carrier, which reproduces the original low-frequency subspectrum as translated up in frequency, and this undesirable product of the unfolding procedure can also be suppressed by lowpass filtering or bandreject filtering. Another undesirable product of the unfolding procedure is an additional lower sideband component of the unfolding carrier which is a reversed-in-frequency subspectrum generated as the difference between the original low-frequency subspectrum and the unfolding carrier. When the horizontal spatial frequency of the folding and unfolding carriers is not much above the uppermost frequency in the original high-frequency subspectrum, this reversed-in-frequency subspectrum occupies the same horizontal-spatial-frequency band as the reproduction of the original high-frequency subspectrum without spectrum reversal. Since it is an in-band artifact of unfolding, removal of this undesirable reversed-in-frequency subspectrum cannot be done by the lowpass filtering or bandreject filtering of the prior art.

The problem of removing the reversed-in-frequency subspectra that are undesirable in-band artifacts of unfolding is solved by applicant and his co-inventors in their U.S. patent application Ser. No. 07/562,907 filed Aug. 6, 1990; entitled "APPARATUS FOR ELIMINATING THE FOLDING CARRIER AND SIDEBANDS FROM THE UNFOLDED VIDEO SIGNAL" and assigned to Samsung Electronics Co., Ltd., which U.S. application corresponds to Korean patent application 90-17610.

SUMMARY OF THE INVENTION

It is an object of the present invention to provide a motion signal detecting circuit for accurately detecting a motion signal which represents a moving image from the unfolded video signal.

To achieve the above object, a motion signal detecting circuit according to the present invention comprises: an input line for receiving an unfolded luminance signal; means for eliminating a folding carrier and sidebands thereof contained in the unfolded luminance signal; and comb filter means for detecting a motion signal which is a difference component between frames of the unfolded luminance signal from the output of the eliminating means.

BRIEF DESCRIPTION OF THE DRAWINGS

The object and features of the present invention will become more readily apparent by the following detailed description of the preferred embodiment in conjunction with the accompanying drawings in which.

DETAILED DESCRIPTION OF THE INVENTION

Figure 1:
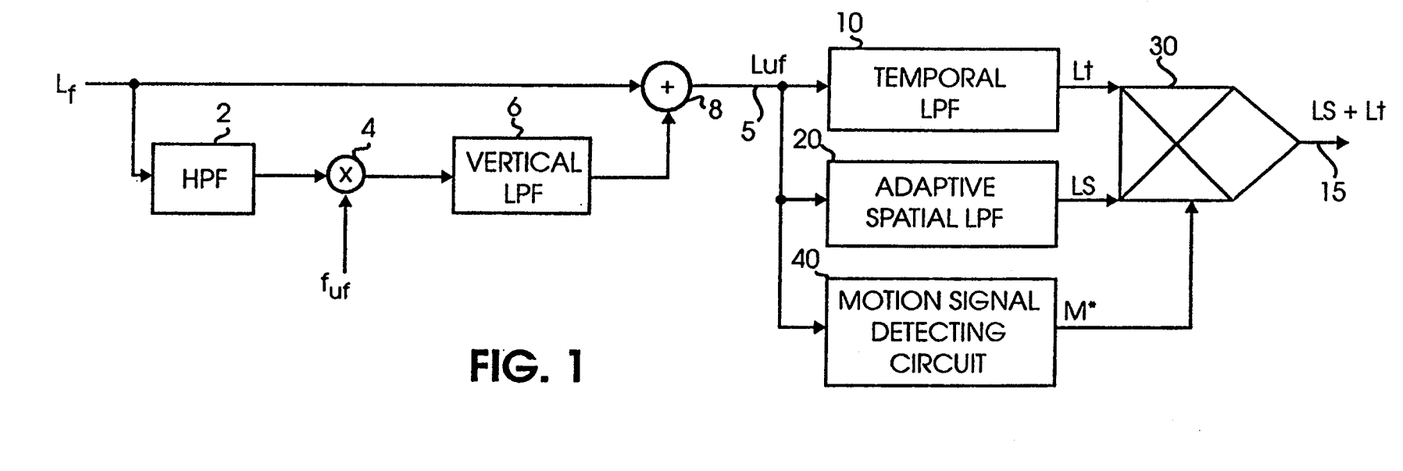
FIG. 1 is a block diagram of a circuit to control transitions between image regions included in the unfolded luminance signal to be transmitted in a video reproducing apparatus to which the present invention is adapted.

In FIG. 1, an input line 5 is connected to a frequency unfolding circuit for receiving an unfolded luminance signal. The frequency unfolding circuit 1 includes a high-pass filler 2, a modulator 4, a vertical low-pass filter 6 and an adder 8 for generating an unfolded luminance signal $L_{uf}$ by unfolding a high frequency component folded into a low frequency component in an original signal frequency band in accordance with an unfolding carrier $f_{uf}$. The input line 5 is connected to respective input terminals of a temporal low pass filter 10, an adaptive spatial low pass filter 20 and a motion signal detecting circuit 40. An output terminal of the temporal low pass filter 10 is connected to a first input terminal of a soft switch 30. An output terminal of the adaptive spatial low-pass filter 20 is connected to a second input terminal of the soft switch 30. An output terminal of the motion signal detecting circuit 40 is connected to a control terminal of the soft switch 30. An output terminal of the soft switch 30 is coupled with an adaptive peaking circuit which is not shown through an output line 15.

In operation of the circuit as shown in FIG. 1, when the level of motion is low, the unfolded luminance signal Luf inputted through the input line 5 lies at temporal low frequencies (close to temporal direct current component). On the contrary, the level of motion is high, the unfolded luminance signal Luf inputted through the input line 5 lies at spatial low frequencies. Accordingly, in the presence of a high level of motion, the image may overlap temporally with the unfolded luminance signal. In the presence of a low level of motion, the image may overlap spatially with the unfolded luminance signal Luf.

The temporal low pass filter 10 separates a temporally derived luminance signal Lt from the unfolded luminance signal Luf by temporally filtering the unfolded luminance signal Luf.

The adaptive spatial low pass filter 20 separates a spatially derived luminance signal Ls from the unfolded luminance signal Luf by adaptively spatially filtering the unfolded luminance signal Luf.

The motion signal detecting circuit 40 generates the motion control signal M* by detecting the motion level of the image from the unfolded luminance signal Luf.

The soft switch 30 controls the proportion of the unfolded luminance signals Lt and Ls which are respectively separated temporally and spatially from the unfolded luminance signal Luf, in accordance with the motion control signal M* fed from the motion signal detecting circuit 40.

When a level of the motion control signal M* is zero or nearly zero, the output of the soft switch 30 is the same as that of the temporal low pass filter 10.

As the level of the motion control signal M* gradually increases, the proportion of the input from the temporal low pass filter 10 decreases and the proportion of the input from the adaptive spatial low pass filter 20 increases. When the level of the motion control signal M* is relatively high, the output of the soft switch 30 is the same as that of the adaptive spatial low pass filter 20.

Figure 2:
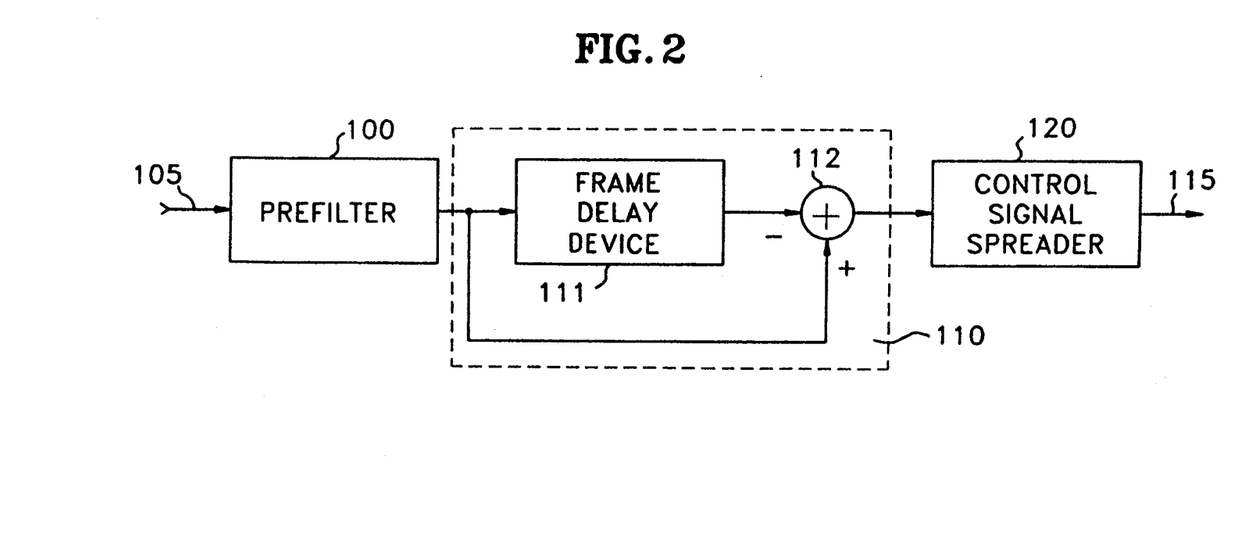
FIG. 2 is a block diagram of a preferred embodiment of a motion signal detecting circuit according to the present invention.

FIG. 2 shows a block diagram of a motion signal detecting circuit according to the present invention.

In FIG. 2, an input line 105 is connected to the input line 5 shown in FIG. 1 and an input terminal of a prefilter 100, respectively.

An output terminal of the prefilter 100 is connected to an input terminal of a frame delay device 111 and a second input terminal of a subtracter 112. An output terminal of the frame delay device 111 is coupled with a first input terminal of the subtracter 112. An output terminal of the subtracter 112 is connected to an input terminal of a control signal spreader 120. An output terminal of the control signal spreader 120 is connected to a control terminal of the soft switch 30 shown in FIG. 1 through an output line 115.

In operation of the circuit as shown in FIG. 2, prefilter 100 eliminates the folding carrier and sideband contained in an unfolded luminance signal Luf by filtering the unfolded luminance signal Luf received through input line 105. The circuit diagram of the prefilter 100 is described in the Korean patent application 90-17610 corresponding to the U.S. patent application Ser. No. 07/562,907 on the invention entitled "An improved apparatus for eliminating the folding carrier and sidebands from the unfolded video signal" U.S. applicant filed on Aug. 6, 1990, by Ko. et al desirably comprised of the circuit as shown in FIG. 3.

Figure 3:
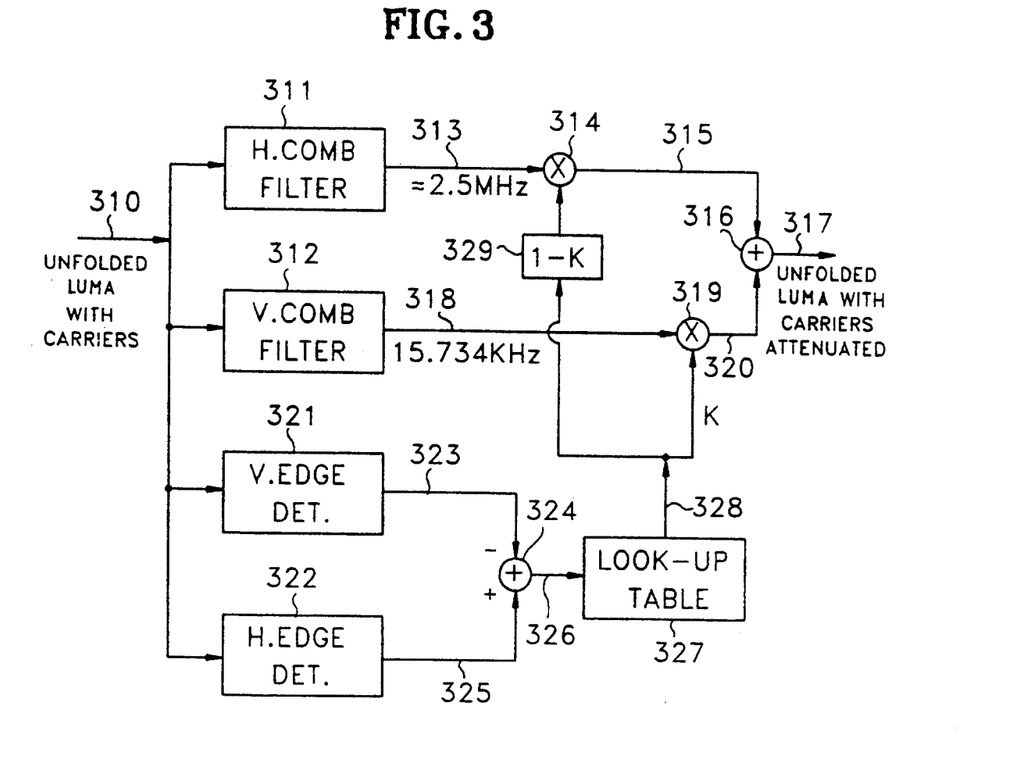
FIG. 3 is a detailed circuit diagram of a prefilter adapted for use in the FIG. 2 motion signal detecting circuitry, which signal spreader is of the type shown in U.S. patent application Ser. No. 07/562,907 filed Aug. 6, 1990, by C. H. Strolle et alii.

Referring to FIG. 3, equal amplitudes of the unfolded luminance signal on input line 310 are passed through the horizontal comb filter 311 and the vertical comb filter 312, and, unless affected by multipliers 314 and 319, equal amplitudes of the two signals are combined in adder 316 and the sum is available at the output 317. The horizontal comb filter 311 is designed to cancel the sidebands of the folding carrier at or above 2.5 MHz, and the vertical comb filter 312 is designed to cancel the line frequency of 15,734Hz. However, the cancellations of the carrier and sidebands may be incomplete since they are affected by the brightness variations in the picture being scanned. Cancellations of the horizontal and vertical carriers on the output line 317 is achieved by the operation of the vertical scan edge detector 321 and the horizontal scan edge detector 322. When a "vertical" edge or discontinuity is detected during a vertical scan, a signal over line 323 and through subtracter 324 to the look-up table 327 causes a signal having a value of K over line 328 from look-up table 327 to increase the proportion of the output at 317 from the horizontal comb filter 311, whose output is not affected by the vertical edge, and decrease the proportion from the vertical comb filter 312. Likewise, when a "horizontal" edge is detected during a horizontal scan, a signal over line 325 and through subtracter 324 causes a signal having a value of K over line 328 both to increase the proportion of the output at 317 from the vertical comb filter 312 whose output is not affected by the horizontal edge, and decrease the proportion from the horizontal comb filter 311. In each case, the cancellation of carrier components is improved by increasing the output proportion from the comb filter whose output is not affected by the brightness edge encountered.

The frame delay device 111 delays by a time corresponding to one frame the unfolded luminance signal from which the folding carrier and sidebands are eliminated, and supplies it to the first input terminal of the subtracter 112.

The subtracter 112 subtracts the output of the frame delay device 111 from the output of the prefilter 100, generates the difference signal between frames of the unfolded luminance signal, and supplies the magnitude of that difference signal to the control signal spreader 120 as the motion signal.

The frame delay device 11i and the subtracter 112 constitute a comb-filter.

The control signal spreader 120 spreads the motion signal temporally, vertically, and horizontally, and supplies the spread signal to the control terminal of the soft switch 30 shown in FIG. 1 as the motion control signal. In FIG. 2, the control signal spreader 120 can be constructed in the manner taught by the inventor and another in their U.S. Pat. No. 5,083,203 issued Jan. 21, 1991; entitled "CONTROL SIGNAL SPREADER" and assigned to Samsung Electronics Co., Ltd., which may be desirably comprised of the circuit as shown in FIG. 4.

Figure 4:
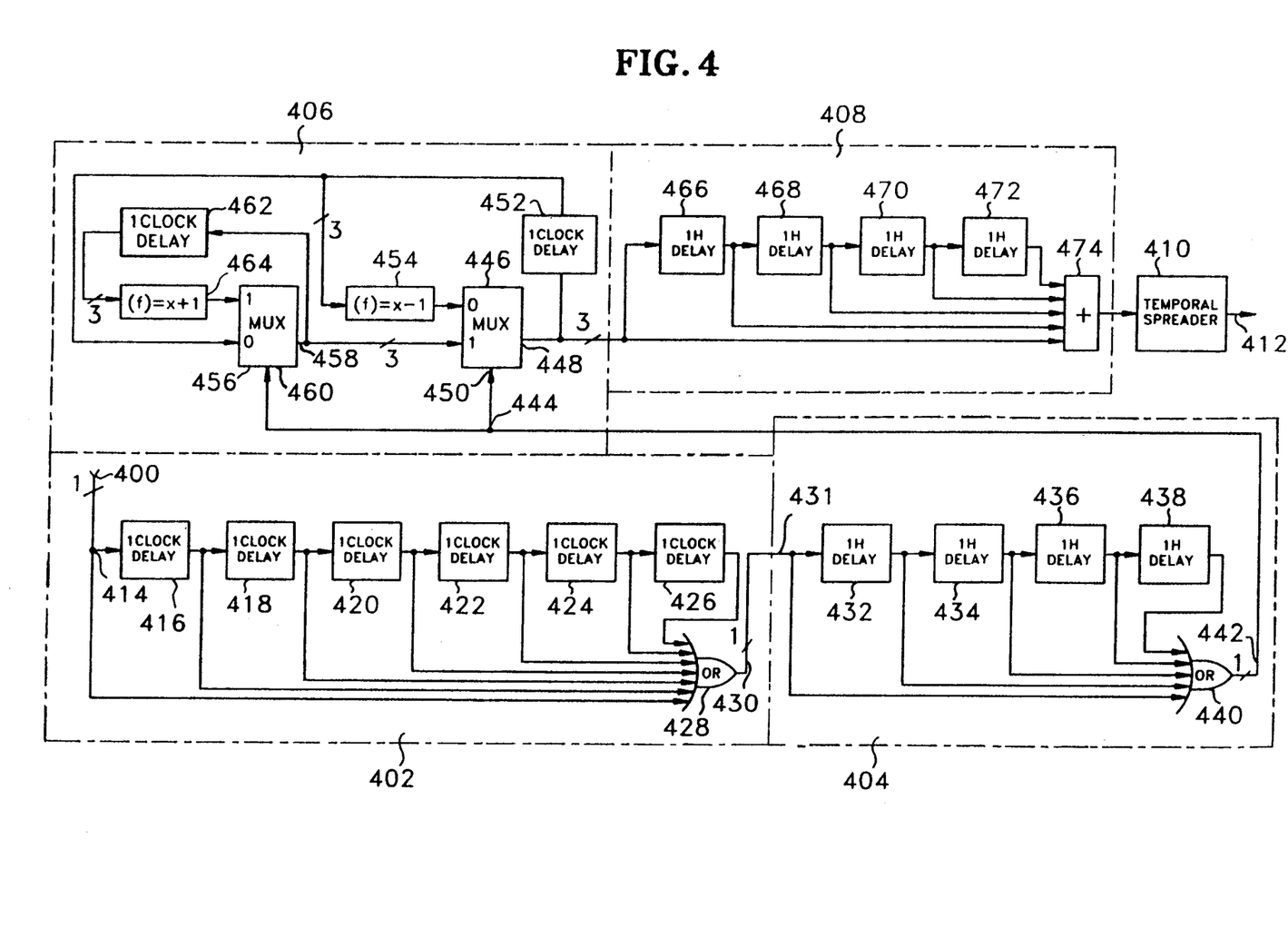
FIG. 4 is a detailed circuit diagram of a signal spreader adapted for use in the FIG. 2 motion signal detecting circuitry, which signal spreader is of the type shown in U.S. Pat. No. 5,083,203.

Referring to FIG. 4, the horizontal widener 402 has an input terminal 414 connected to a series of six clock delays 416 through 426. The output of an OR gate 428 is connected to an output terminal 430, and seven inputs of the OR gate 428 are respectively connected to the input terminal 415 and the ends of the clock delays 416–426 that are remote from the input terminal 414. Any motion signal having an amplitude of 1 indicating the presence of a phenomenon such as motion will be repeated six times at the output terminal 430.

The vertical widener 404 comprises four 1-H delays 432, 434, 436, and 438 connected in series to an input terminal 431 and OR gate 440 of which the output is connected to an output terminal 442 and five inputs are respectively connected to the input terminal 431 and the ends of the 1-H delays 432–438 that are remote from the input terminal 431 will be repeated four times at the output terminal 442.

The motion signals having the logic value of 0 pass through horizontal widener circuits 402 and vertical widener circuit 404 without delay, whereas the logic value of 1, indicating the presence of a phenomenon such as motion, is repeated so as to form a rectangle of logic 1's that is 7 clock cycles wide and 5 lines high.

The line signal spreader 406 is coupled to the output terminal 444 of the vertical widener 404 and functions to produce a ramp of increasing signal values along a line that increases from the value of 0 to a maximum, such as 7, during the first 6 motion signal periods referred to. It then holds the maximum value as long as 1's appear at the terminal 444, and when they cease, it produces a ramp of decreasing signal values along the line over a period of 6 clock cycles. This is done in the same way along the line whenever the motion signal assumes the logic value of 1, and along the 4 succeeding lines so that there are 5 identical lines.

For performing the line signal spreading function just described, a MUX 446 has an output 448, an input labeled 0, an input labeled 1 and a switching control input 450 to which logical values of 0 and 1 may be applied. When a logic 0 is applied to the control input 450, the output 448 is connected to the input labeled 0, and when a logic 1 is applied to the input 450, the output 448 is connected to the input labeled 1. A one clock delay element 452 and a generator 454 that performs the function $f(x)=x-1$ are connected in series between the output 448 and the input labeled 0. The generator 454 cannot go below a value of 0. Thus, when no motion is detected and a logic 0 is at the input terminal 400, logic 0's are passed through the widener circuits 402 and 404 to the terminal 444, and the output 448 of the MUX 446 will be 0. If by some chance the signal at the output 448 of the MU 446 should be other than 0. It will be reduced to 0 in at most 4 clock cycles by the operation of the generator 454. As will be seen, the MUX 446 will produce the ramp of decreasing values previously referred to.

The ramp of increasing values, previously referred, to is formed by a MUX 456. It has an output 458 that is connected to the input of MUX 446 that is labeled 1, an input labeled 0. an input labeled 1 and a switching control input 460 to which logic values of 0 to 1 may be applied. As in the MUX 446, a logic 1 at the control input 460 connects the output 458 to the input labeled 1, and a logic 0 at the control 460 connects the output 458j to the input labeled 0. A one clock delay 462 and a generator 464 that performs the function $f(x)=x+1$ are connected in series between the output 458 and the input labeled 1. The generator 464 cannot produce a signal value above some selected maximum, such as 7. The input of the MUX 456 that is labeled 0 is coupled to the output 448 of the MUX 446.

For making the signal values for corresponding pixels along the scan lines available, the vertical signal spreader 408 comprise four 1-H delays 466, 468, 470 and 472 and an adder 474 for adding the output 448 and the outputs of the four 1-H delays 466 through 472.

Here, the motion signal values at the output 448 and at the ends of the four 1-H delays 466 through 472 that are remote from the output 448 could be respectively weighted before they are combined in the means for combining them, that is, an adder 474. Also, the temporal spreader 410 is suitably composed of a low-pass filter. It provides gradual transitions between still and motion portions of a scene in the temporal domain. The output of the temporal spreader 410 is supplied to the control switch 30 of FIG. 1 through an output line 115. Here, the output line 412 is identical with the output line 115 of FIG. 2.

As described above, according to the present invention, it is possible to detect the motion signal from the unfolded luminance signal by utilizing a comb filter after removing the folding carrier and the sidebands thereof contained in the unfolded luminance signal by the prefilter.

In addition, by spreading the detected motion signal temporally, vertically and horizontally by the control signal spreader and supplying the spread motion signal as the motion control signal, undesirable artifacts due to the distinct boundaries between image regions can be removed.

Figure 5:
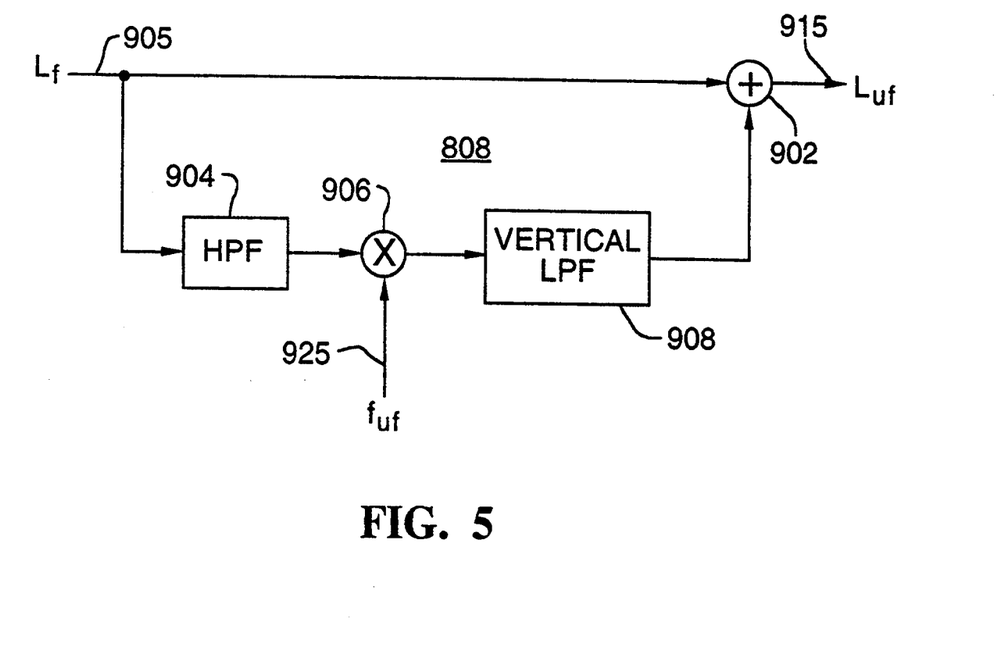
FIG. 5 is a circuit diagram of unfolding circuitry suitable for regenerating a full-bandwidth, wide-spectrum luminance signal $L_{uf}$, proceeding from the reduced-bandwidth folded-spectrum of a folded-luminance signal $L_f$, which unfolding circuitry is of the type shown in U.S. Pat. No. 5,113,262.

FIG. 5 shows unfolding circuitry suitable for regenerating the full-bandwidth, wide-spectrum luminance signal $L_{uf}$, proceeding from the reduced-bandwidth folded-spectrum of a folded-luminance signal $L_f$ comprising a succession of digital samples supplied at a sampling rate. This unfolding circuitry is particularly suited to the improved video signal recording system described in U.S. Pat. No. 5,113,262 in which a folded-luminance signal is used to frequency modulate the luminance carrier, which is combined with an amplitude-modulated 629 kHz color-under carrier signal for recording on the video tape. The folded-luminance signal is recovered during playback by FM discrimination of the luminance carrier and is likely to contain remnants of the color-under signal. The unfolded luminance signal Luf is supplied from the FIG. 5 unfolding circuitry to the FIG. 1 adaptive filter circuitry, the circuitry of FIGS. 5 and 1 combining to form an adaptive unfolding circuit.

In FIG. 5, an input terminal 905 receptive of the folded-luminance signal $L_f$ is coupled to an input terminal of a high pass filter (HPF) 904 and a first input terminal of an adder 902. An output terminal of the adder 902 is coupled to an output terminal 915. The output terminal 915 produces the unfolded luminance signal $L_{uf}$, which is supplied to the remainder of the adaptive unfolding circuit illustrated in FIG. 1.

An output terminal of the HPF 904 is coupled to an input terminal of a modulator 906. An output terminal of the modulator 906 is coupled to an input terminal of a vertical low pass filter (LPF) 908. An output terminal of the vertical LPF 908 is coupled to a second input terminal of the adder 902. An input terminal 925 is coupled to a source (not shown) of an unfolding carrier signal $f_{uf}$. The input terminal 925 is coupled to a second input terminal of the modulator 906.

In operation, input signal $L_f$ is the limited-bandwidth folded luminance signal. The horizontal HPF 904 filters out the frequencies below the folded luminance signal containing the remnants of the color-under signal. When the sideband luminance signal is folded around a folding carrier at about 5 MHz by the record circuitry, the highest frequency luminance signal, at about 4.2 MHz is folded to about 800 kHz. Thus, the break frequency of the horizontal HPF 904 is preferably about 750 kHz. Then, the modulator 906 responds to the high-pass-filtered signal and to an unfolding carrier $f_f$, which has the same about 5 MHz frequency as the folding carrier, to generate a demodulated signal. The modulator 906 may be constructed in a known manner using a four quadrant multiplier, or may be a $+1,-1$ type modulator using a clock signal at one half the sampling frequency.

The demodulated signal from modulator 906 is then filtered by the vertical LPF 908. The processing performed by vertical LPF 908 may also be described as averaging, which increases the signal-to-noise ratio of the resulting signal. The adder 902 adds this signal to the received folded luminance signal $L_f$ from the input terminal 905. The resulting unfolded signal $L_{uf}$ consists of a full-bandwidth unfolded luminance signal centered around temporal, vertical and horizontal DC, and an image of the full-bandwidth luminance signal centered about the unfolding carrier which has frequency at one-half the maximum temporal frequency, at one-half the maximum vertical frequency and at a horizontal frequency of about 5 MHz. This image of the luminance signal must be removed, and this removal is carried out in the FIG. 1 adaptive filter circuitry.

What is claimed is:

1. A motion signal detecting circuit for an image signal reproducing system having frequency-unfolding means for generating unfolded luminance signals by unfolding regenerated image signals having a high frequency component folded onto a low frequency component, said regenerated image signals having a high frequency component folded onto a low frequency component which high frequency component as so folded exhibits differences from one frame to the next in the absence of image motion, which said differences from one frame to the next in the absence of image motion will interfere with frame-to-frame detection of motion, said unfolded luminance signals at times being undesirably accompanied by a folding carrier signal that exhibits differences from one frame to the next as are apt to be mistaken for image motion, said motion signal detecting circuit comprising:
   means, receiving said unfolded luminance signals, for eliminating folding carrier signal contained in said unfolded luminance signals;
   comb filter means for detecting differences between frames of said unfolded luminance signals; and
   means for applying said unfolded luminance signals to said comb filter means as input signals thereto.

2. A circuit as claimed in claim 1, further comprising control signal spreader means for temporally, vertically and horizontally spreading the detected differences generated by said comb filter means to thereby generate spread differences.

3. A circuit as claimed in claim 1, wherein said regenerated image signals are regenerated from a recording medium having a limited bandwidth, then unfolded to generate said unfolded luminance signals having a full bandwidth.

4. A circuit as claimed in claim 2, wherein the temporal, vertical and horizontal spreading of the detected differences by said control signal spreader means removes undesirable artifacts generated by distinct boundaries between image regions.

5. A motion signal detecting circuit for an image signal reproducing system having frequency-unfolding means for generating unfolded luminance signals by unfolding regenerated image signals having a high frequency component folded onto a low frequency component, said regenerated image signals having a high frequency component folded onto a low frequency component which high frequency component as so folded exhibits differences from one frame to the next in the absence of image motion, which said differences from one frame to the next in the absence of image motion will interfere with frame-to-frame detection of motion, said frequency unfolding means of a type generating unfolded luminance signals at times undesirably accompanied by folding carrier signal and sideband components of said folding carrier signal that exhibit differences from one frame to the next as are apt to be mistaken for image motion, said motion signal detecting circuit comprising:
   means, receiving said unfolded luminance signals, for eliminating folding carrier signal and sideband components of said folding carrier signal, as contained in said unfolded luminance signals; and
   comb filter means for detecting differences between frames of said unfolded luminance signals after said folding carrier signal and sideband components of said folding carrier signal are eliminated therefrom by said means for eliminating folding carrier signal and sideband components of said folding carrier signal.

6. A circuit as claimed in claim 1, wherein said comb filter means detects said differences from said unfolded luminance signals having said folding carrier signals eliminated by said eliminating means.

7. A motion signal processing circuit for an image signal reproducing system, said motion signal processing circuit comprising:
   frequency-unfolding means for generating unfolded luminance signals by unfolding regenerated image signals having a high frequency component folded onto a low frequency component, said unfolded luminance signals at times being undesirably accompanied by in-band artifacts of folding and unfolding; and
   motion signal detecting means, for generating spread motion signals, comprising
   prefilter means for eliminating said in-band artifacts contained in said unfolded luminance signals to generate prefiltered unfolded luminance signals, comb filter means for detecting frame difference signals between frames of said prefiltered unfolded luminance signals, and control signal spreader means for temporally, vertically and horizontally spreading said frame difference signals generated by said comb filter means to generate spread motion signals.

8. A motion signal processing circuit as claimed in claim 7, wherein said comb filter means comprises:

frame delay means for delaying said prefiltered unfolded luminance signals by one frame period and subtractor means for generating said frame difference signals by calculating a difference between said prefiltered unfolded luminance signals and said prefiltered unfolded luminance signals delayed by said frame delay means.

9. A motion signal processing circuit for an image signal reproducing system, said motion signal processing circuit comprising:

frequency-unfolding means for generating unfolded luminance signals by unfolding regenerated image signals having a high frequency component folded onto a low frequency component; and motion signal detecting means for generating spread motion signals, comprising prefilter means for eliminating folding carrier signals contained in said unfolded luminance signals to generate prefiltered unfolded luminance signals, comb filter means for detecting frame difference signals between frames of said prefiltered unfolded luminance signals, and control signal spreader means for temporally, vertically and horizontally spreading said frame difference signals generated by said comb filter means to generate spread motion signals, wherein said prefilter means comprises:

horizontal comb filter means for generating sideband cancelled unfolded luminance signals by cancelling sidebands of said folding carriers in said unfolded luminance signals;

vertical comb filter means for generating line cancelled unfolded luminance signals by cancelling line frequencies in said unfolded luminance signals;

mixer means for generating said prefiltered unfolded luminance signals by proportionally mixing said line cancelled unfolded luminance signals and said sideband cancelled unfolded luminance signals;

vertical edge detector means for detecting vertical discontinuities in said unfolded luminance signals during vertical scan and controlling said mixer means to increase a proportion of said sideband cancelled unfolded luminance signals and decrease a proportion of said line cancelled unfolded luminance signals in said prefiltered unfolded luminance signals; and horizontal edge detector means for detecting horizontal discontinuities in said unfolded luminance signals during horizontal scan and controlling said mixer means to increase a proportion of said line cancelled unfolded luminance signals and decrease a proportion of said sideband cancelled unfolded luminance signals in said prefiltered unfolded luminance signals.

10. A motion signal processing circuit for an image signal reproducing system, said motion signal processing circuit comprising:

frequency-unfolding means for generating unfolded luminance signals by unfolding regenerated image signals having a high frequency component folded onto a low frequency component; and motion signal detecting means, for generating spread motion signals, comprising prefilter means for eliminating folding carrier signals contained in said unfolded luminance signals to generate prefiltered unfolded luminance signals, comb filter means for detecting frame difference signals between frames of said prefiltered unfolded luminance signals, and control signal spreader means for temporally, vertically and horizontally spreading said frame difference signals generated by said comb filter means to generate spread motion signals, wherein said control signal spreader means comprises:

a horizontal widener for horizontally spreading motion regions in said frame difference signals;

a vertical widener for vertically spreading motion regions in said frame difference signals;

a line signal spreader for horizontally smoothing said motion regions in said frame difference signals vertically and horizontally spread by said vertical widener and by said horizontal widener;

a vertical signal spreader for vertically smoothing said motion regions in said frame difference signals vertically and horizontally spread by said vertical widener and by said horizontal widener; and a temporal spreader for generating said spread motion signals by temporally smoothing transitions between motion regions and still regions in said frame difference signals vertically and horizontally smoothed by said line signal spreader and by said vertical signal spreader.

11. A motion signal processing circuit as claimed in claim 10, wherein said horizontal widener comprises: a plurality of cascaded one clock period delays and an OR gate for generating horizontally spread motion regions by ORing outputs from each of said plurality of cascaded clock delays.

12. A motion signal processing circuit as claimed in claim 10, wherein said vertical widener comprises a first plurality of cascaded one horizontal scan period delays and an OR gate for generating vertically spread motion regions by ORing outputs from each of said first plurality of cascaded one horizontal scan period delays.

13. A motion signal processing circuit as claimed in claim 10, wherein said vertical signal spreader comprises a second plurality of cascaded one horizontal scan period delays and an adder for generating vertically smoothed motion regions by adding outputs from each of said second plurality of cascaded one horizontal scan period delays.

14. An image region transition control circuit for an image signal reproducing system, said image region transition control circuit comprising:

frequency-unfolding means for generating unfolded luminance signals by unfolding regenerated image signals having a high frequency component folded onto a low frequency component;

motion signal detecting means, for generating spread motion signals, comprising prefilter means for eliminating folding carrier signals contained in said unfolded luminance signals to generate prefiltered unfolded luminance signals, comb filter means for detecting frame difference signals between frames of said prefiltered unfolded luminance signals, and control signal spreader means for temporally, vertically and horizontally spreading said frame difference signals generated by said comb filter means to generate spread motion signals;

adaptive spatial low-pass filter means for generating spatially low-pass filtered luminance signals by spatial low-pass filtering said unfolded luminance signals;

temporal low-pass filter means for generating temporally low-pass filtered luminance signals by temporally low-pass filtering said unfolded luminance signals; and soft switch means for proportionally mixing said spatially low-pass filtered luminance signals and said temporally low-pass filtered luminance signals in response to said spread motion signals.

15. A motion signal processing circuit as claimed in claim 14, wherein said soft switch means increases a proportion of said spatially low-pass filtered signals in response to an increase in a level of said spread motion signals.

16. In combination:

apparatus for unfolding a folded-spectrum image-representative signal to generate an unfolded signal descriptive of consecutive image frames scanned in accordance with a raster; and means responding to said unfolded signal for detecting frame-to-frame changes therein at successively scanned points along said raster.

17. In the combination of claim 16 said means for detecting frame-to-frame changes comprising:

a frame comb filter connected for responding to said unfolded signal to perform said detecting frame-to-frame changes therein.

18. A method for detecting motion between consecutive image frames scanned in accordance with a raster, as represented in a folded-spectrum image-representative baseband electric signal, said method comprising the steps of:

generating said folded-spectrum image-representative baseband electric signal;

generating an unfolded image-representative electric signal, responsive to said folded-spectrum image-representative baseband electric signal; and detecting frame-to-frame changes in said unfolded-spectrum image-representative baseband electric signal at successively scanned points along said raster.

19. An image signal reproducing system comprising:

frequency-unfolding means for unfolding a regenerated image signal having a high frequency component folded onto a low frequency component, thereby to generate unfolded luminance signals containing a folding carrier signal comprising at least a sideband of a folding carrier, which sideband overlaps said low frequency component in frequency;

means, receiving said unfolded luminance signals, for generating a response to components of said unfolded luminance signals substantially free of accompanying response to said folding carrier signal; and a motion signal detecting circuit responding to said response to components of said unfolded luminance signals substantially free of accompanying response to said folding carrier signal, said motion signal detecting circuit including comb filter means for detecting differences between frames of said unfolded luminance signals components other than said folding carrier signal.

20. In combination:

apparatus for unfolding a folded-spectrum image-representative signal to generate an unfolded signal descriptive of consecutive image frames scanned in accordance with a raster, which unfolded signal is accompanied by in-band artifacts of folding and unfolding, which in-band artifacts of folding and unfolding exhibit differences from one frame to the next as are apt to be mistaken for image motion;

a filter for responding to said unfolded signal to supply a filter response in which said in-band artifacts of folding and unfolding are suppressed; and a motion detector for detecting frame-to-frame changes in said filter response at successively scanned points along said raster.

21. A method for detecting motion between consecutive image frames scanned in accordance with a raster to generate a video signal, as represented in a folded-spectrum image-representative baseband electric signal, said method comprising the steps of:

generating said folded-spectrum image-representative baseband electric signal by folding a high frequency subspectrum of said video signal into the same frequency band as a low frequency subspectrum of said video signal;

generating an unfolded image-representative electric signal, responsive to said folded-spectrum image-representative baseband electric signal, which unfolded image-representative electric signal is accompanied by in-band artifacts of folding and unfolding that change from frame to frame;

filtering said unfolded image-representative electric signal to generate a filtered response thereto, in which filtered response said in-band artifacts of folding and unfolding are suppressed; and detecting frame-to-frame changes in said filtered response at successively scanned points along said raster.

22. A method for detecting motion between consecutive image frames, as set forth in claim 21, wherein said step of generating an unfolded image-representative electric signal, responsive to said folded-spectrum image-representative baseband electric signal, which unfolded image-representative electric signal is accompanied by in-band artifacts of folding and unfolding, generates said unfolded image-representative electric signal accompanied by said unfolding carrier.

* * * * *

UNITED STATES PATENT AND TRADEMARK OFFICE
CERTIFICATE OF CORRECTION

PATENT NO. : 5,386,235
DATED : Jan. 31, 1995
INVENTOR(S) : Jung-Wan Ko

It is certified that error appears in the above-indentified patent and that said Letters Patent is hereby corrected as shown below:

| | | |
|---|---|---|
| Column 2, | Line 31, | after "alii", change "," to --; --; |
| | Line 39, | after "5,113,262", insert --,--; |
| Column 4, | Line 49, | after "adapted", change "." to --;--; |
| | Line 52, | after "invention", change "." to --;--; |
| Column 5, | Line 5, | between "circuit" and "for", insert --1--; |
| Column 6, | Line 21, | between "al" and "desirably", insert --which may be--; |
| Column 7, | Line 1, | after "device", change "11i" to --111--; |
| | Line 19, | after "terminal", change "415" to --414--; |
| | Line 66, | before "should", change "MU" to --MUX--; |

UNITED STATES PATENT AND TRADEMARK OFFICE
CERTIFICATE OF CORRECTION

PATENT NO. : 5,386,235
DATED : Jan. 31, 1995
INVENTOR(S) : Jung-Wan Ko

It is certified that error appears in the above-indentified patent and that said Letters Patent is hereby corrected as shown below:

Column 8, Line 10, after "458", delete "j";

Line 62, after "signal", change "Luf" to --$L_f$-- ;

Line 64, before " 5 and 1", change "FIGS." to --FIGs.--:

Signed and Sealed this

Eighth Day of July, 1997

Attest:

BRUCE LEHMAN

Attesting Officer    Commissioner of Patents and Trademarks